US006189851B1

(12) United States Patent
Ozark et al.

(10) Patent No.: US 6,189,851 B1
(45) Date of Patent: Feb. 20, 2001

(54) APPARATUS FOR HOLDING BEVERAGE CONTAINERS AND OTHER ARTICLES

(75) Inventors: L. John Ozark, Pointe Woods; Ricardo Z. Aneiros, Dearborn, both of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/257,701

(22) Filed: Mar. 2, 1999

(51) Int. Cl.[7] .................................................. A47K 1/08
(52) U.S. Cl. ...................... 248/311.2; 224/542; 224/926
(58) Field of Search ................................. 248/311.2, 313, 248/310, 346.01; 296/37.8, 37.14; 224/926, 539, 542; D12/419, 420

(56) References Cited

U.S. PATENT DOCUMENTS

| D. 249,263 | * | 9/1978 | Neece ..................................... D14/99 |
| D. 359,266 | * | 6/1995 | Karp et al. ........................... D12/419 |
| 4,438,637 | * | 3/1984 | Atkinson ............................... 62/457.5 |
| 4,708,386 | | 11/1987 | Moore et al. ......................... 296/37.8 |
| 4,712,823 | | 12/1987 | Mills et al. ........................... 296/37.8 |
| 4,807,897 | | 2/1989 | Schultz .................................. 280/250 |
| 4,981,277 | | 1/1991 | Elwell ................................... 248/311.2 |
| 5,170,980 | * | 12/1992 | Burrows et al. .................... 248/311.2 |
| 5,174,534 | * | 12/1992 | Mitchell ............................... 248/311.2 |
| 5,289,962 | | 3/1994 | Tull et al. ............................. 224/544 |
| 5,490,653 | * | 2/1996 | Ingwersen .......................... 248/311.2 |
| 5,509,633 | * | 4/1996 | Ruster et al. ....................... 248/311.2 |
| 5,628,441 | * | 5/1997 | Dykstra ................................ 224/483 |
| 5,634,621 | * | 6/1997 | Jankovic .............................. 248/311.2 |
| 5,639,052 | | 6/1997 | Sauve .................................. 248/311.2 |
| 5,702,041 | * | 12/1997 | Sun et al. ............................. 224/539 |
| 5,860,534 | * | 1/1999 | Minneman et al. ................. 211/13.1 |
| 5,881,935 | * | 3/1999 | Ono et al. ............................ 224/282 |
| 5,921,519 | * | 7/1999 | Dexter et al. ....................... 248/311.2 |
| 6,050,468 | * | 4/2000 | Kelley ................................. 224/542 |
| 6,109,580 | * | 8/2000 | Stern et al. ......................... 248/311.2 |

FOREIGN PATENT DOCUMENTS

310189 * 4/1929 (GB) ................................. 248/311.2

* cited by examiner

*Primary Examiner*—Anita M. King
(74) *Attorney, Agent, or Firm*—Marc Lorelli

(57) ABSTRACT

An apparatus for holding beverage containers and other articles is provided. The apparatus includes two cylindrically shaped receptacles with a channel formed therebetween. The receptacles and channel are formed by a generally planar back wall that is substantially tangent to both receptacles, two arcuate side walls, and a front wall. The channel is off-set away from the lateral centerline of the apparatus to allow for reception of pencils, letters, note pads, and other such objects into the apparatus at the same time as beverage containers.

5 Claims, 2 Drawing Sheets

APPARATUS FOR HOLDING BEVERAGE CONTAINERS AND OTHER ARTICLES

BACKGROUND OF THE INVENTION

1. Technical Field

The present invention generally relates to vehicles and an apparatus for increasing driver and passenger convenience within the vehicle. More specifically, the present invention relates to a cup holder which can accommodate many articles in addition to typical beverage containers.

2. Discussion

With the ever-increasing time demands placed on individuals lives, people are continually looking for ways to maximize their time. People tend to do more and more activities on the go. For some people, this means living essentially in their vehicles. Some people communicate to others while in their car and others eat meals in their car. These trends are most likely accountable for the proliferation of cellular phones and drive through food and beverage services.

In order to accommodate the needs of their customers, automobile manufacturers typically include various storage bins and some type of cup holder in every vehicle. In recent years, the cup holder has become an increasingly important feature in all motor vehicles.

The design of cup holders has changed drastically over the years. Initial cup holders were sized to hold twelve-ounce cans and could not accommodate size variation. More recently, automotive manufacturers have introduced cup holders with clamping mechanisms to accommodate a wide variety of beverage container sizes and shapes.

A popular design for a dual cup holder is depicted in U.S. Pat. No. 4,807,897, issued Feb. 28, 1989, assigned to Center-Tech Incorporated. The cup holder illustrated in the drawings of this patent includes two cylindrical receptacles connected by a channel at the centers thereof. This design provides for a coffee mug type container with a handle to be placed in one of the receptacles. This popular design had been improved upon in recent years. Commonly assigned U.S. Ser. No. 08/997,641, filed Dec. 23, 1997 illustrates a three-receptacle design connected by channels so that two mugs and a third traditional beverage container may be accommodated contemporaneously. This application illustrates the continued need to improve upon yesterday's cup holders.

Many vehicle owners use their cup holders differently. Some use the cup holders to hold beverage containers and nothing else. Others use the cup holders to store coins or other small objects. Others use them to hold cellular phone and even others use them to hold letters, pencils, and many other similar objects.

There is, therefore, a need to provide an apparatus for a motor vehicle that can effectively hold beverage containers as well as other commonly used objects at the same time. It is conceded that many, if not all, cupholders can hold other objects instead of beverage containers, however, most lack the ability to hold other objects contemporaneously with beverage containers. For example, it can be seen from U.S. Pat. No. 4,807,897 that letters could not be held in a longitudinal manner by the cup holder at the time as a beverage container without deforming the letters. It can also be appreciated that by placing a pencil or other elongated object in the channel interconnecting the two receptacles will compromise the apparatus' ability to effectively hold a beverage container.

SUMMARY OF THE INVENTION

Accordingly, it is a principal objective of the present invention to provide an apparatus that can effectively hold beverage containers and other objects contemporaneously.

It is another objective of the present invention to provide a center console including an apparatus that can effectively hold beverage containers and other objects contemporaneously in a space efficient manner.

It is yet another object of the present invention to provide an apparatus that can effectively hold letters or other thin elongated objects as well as beverage containers at the same time.

It is yet a further object of the present invention to provide an apparatus that can effectively hold coins or other small objects as well as beverage containers contemporaneously.

In one form, the present invention provides a preferred embodiment for an apparatus for holding articles that includes a first arcuate side wall that defines a substantial portion of a first cylindrical receptacle. The invention also includes a second arcuate side wall that defines a substantial portion of a second cylindrical receptacle. A back wall is formed substantially tangent to both the first and second receptacle. Each receptacle includes an inboard portion and an outboard portion. The outboard portion of each receptacle is substantially defined by the first and second arcuate side walls. The inboard portions of the receptacles are adjacent to one another. The back wall extends laterally beyond the inboard portions of the receptacles. A front wall is also provided to cooperate with the back wall to define a channel that interconnects the receptacles. The channel is off-set from the lateral centerline of the apparatus to allow for reception of pencils, letters, note pads, and other such objects into the apparatus at the same time as beverage containers.

In another form, the present invention also includes a first alternative embodiment that includes a floor defining the bottom of the channel and receptacles in addition to the structure described in the preferred embodiment. This embodiment also includes a first ridge extending along the border between the first receptacle and the channel and a second ridge extending along the border between the second receptacle and the channel. The area defined by the back wall, the front wall, the floor, and the ridges define a shallow storage area in which coins, keys, and other like objects can be stored.

In another form, the present invention also includes a second alternative embodiment that includes a plurality of ridges in the channel that project from the floor and extend in a lateral direction in addition to the structure described in the preferred embodiment. The plurality of ridges are adopted to hold letters, or the like, in a lateral position within the apparatus.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
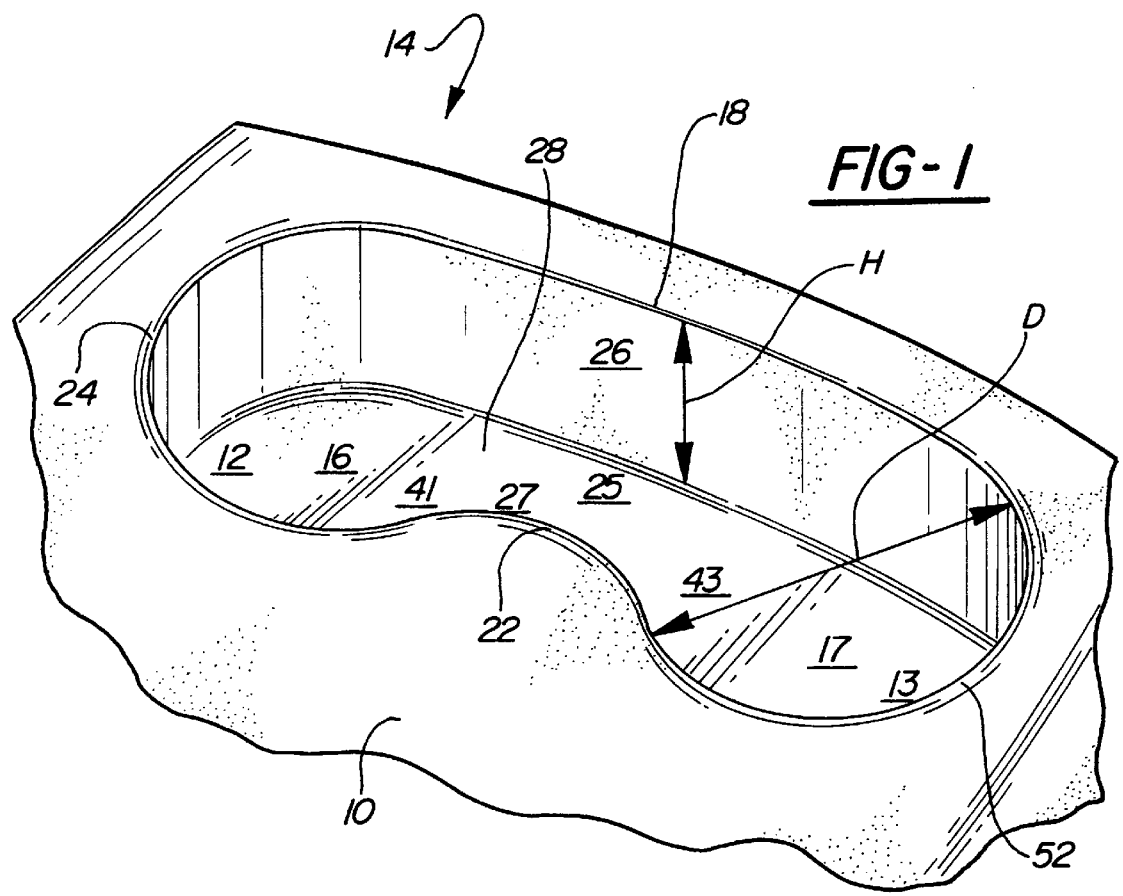
FIG. 1 is a perspective view illustrating a vehicles center console including an apparatus for holding articles.
Figure 2:
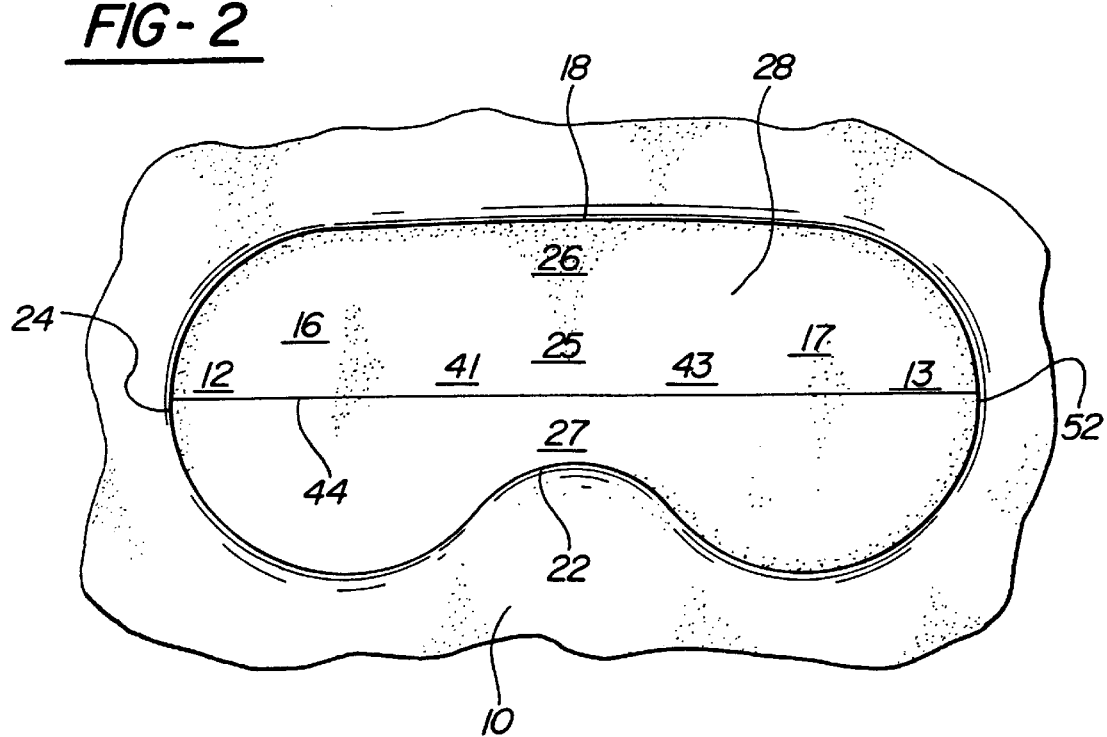
FIG. 2 is a top view of a preferred embodiment of an apparatus for holding articles.

Reference will now be made in detail to the preferred embodiments of the invention, examples of which are illustrated in the accompanying drawings. Turning to FIG. 1, a center console 10 is disposed in a vehicle in accordance with the principals of the present invention. Console 10 is disposed between the driver's and passenger's seat and includes a shifting mechanism (not shown), which can be either manual or automatic. An apparatus for holding articles 14 is provided towards an end of console 10, which is near the instrument panel of the vehicle. Apparatus 14 includes two cylindrical receptacles 16 and 17 formed therein. Receptacle 16 is formed by an arcuate side wall 24 that defines the outboard portion 12 thereof, receptacle 17 is formed by a similar arcuate side wall 52 that defines the outboard portion 13 thereof. Receptacles 16 and 17 share a common back wall 18. Back wall 18 extends laterally beyond the inboard portions 41 and 43 of receptacles 16 and 17 respectively. It should be appreciated that the inboard portions 41 and 43 of the two receptacles 16 and 17 are defined such that they are the portion of their respective cylindrical receptacle that is closest to the other receptacle. Arcuate side walls 24 and 52 are connected by front wall 22. It should also be appreciated that back wall 18 and front wall 22 create a channel 25 between receptacles 16 and 17. Receptacles 16 and 17 and channel 25 have a floor 28 at substantially the same elevation.

The rear portion 26 of channel 25 is disposed such that letters, pencils, and other similar objects can be placed within apparatus 14 at the same time as beverage containers are placed therein. The front portion 27 of channel 25 can be used to accommodate the handles of some type of beverage containers that may be placed within receptacles 16 and 17.

Figure 4:
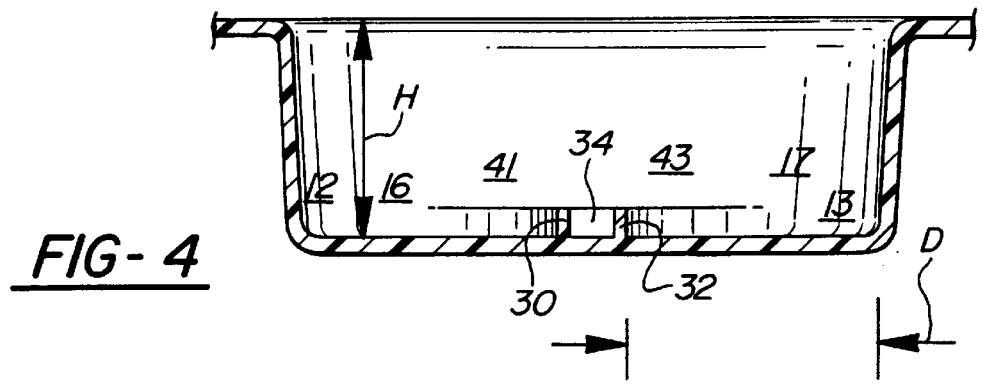
FIG. 4 is a cross sectional view of the first alternative embodiment along the line 4—4 of FIG. 3.

The height, as referenced by H in FIG. 1, of the back wall 18 which is substantially equal to the height of the arcuate side wall 24 and 52 as well as the front wall 22. The receptacles 16 and 17 each include a diameter, as referenced by D in FIG. 1. In order to prevent tipping of a beverage receptacle, the height H of the arcuate side walls 24 and 52 are related in size to the diameter D, this relationship is further illustrated in FIG. 4. The height H may vary, but in order to prevent tipping of a beverage container, the H should be larger than the radius, i.e. D divided by two.

Figure 3:
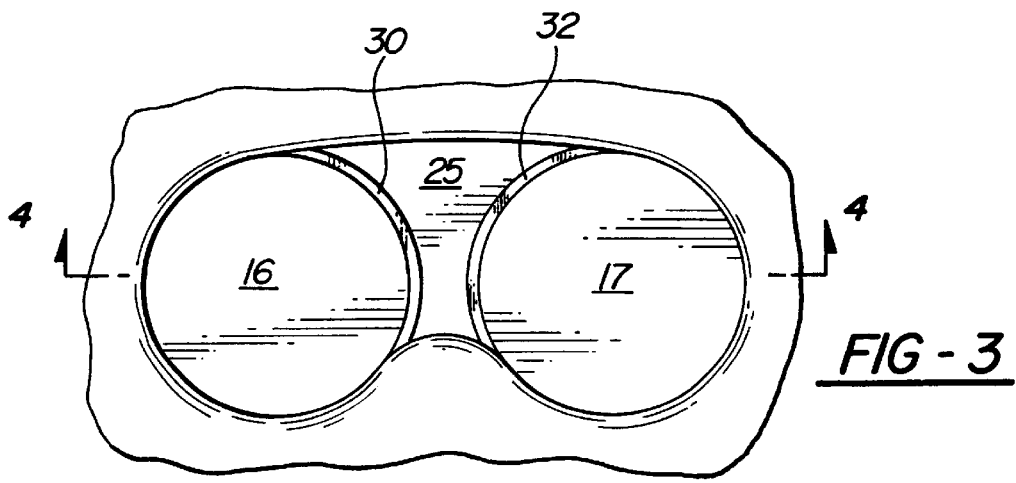
FIG. 3 is a top view of a first alternative embodiment of an apparatus for holding articles.

Turning to FIG. 3, a first alternative embodiment is illustrated in a top view. The first alternative embodiment includes a left ridge 30 projecting from floor 28 between receptacle 16 and channel 25. Also included is a right ridge 32 projecting from the floor 28 between receptacle 17 and channel 25. Ridges 30 and 32 preferably extend one half inch from floor 28 so as to not compromise the apparatus' 14 ability to hold beverage containers with handles. This embodiment provides an area 34, as best seen in the cross sectional view provided in FIG. 4, with defined walls so that it is capable of holding coins or other objects without interfering with the ability of the receptacles 16 and 17 to hold beverage containers. It should be noted that some people use cup holders to hold coins which doesn't allow a beverage to be securely placed therein. The first alternative embodiment successfully alleviates this shortcoming of previous cup holders.

Figure 5:
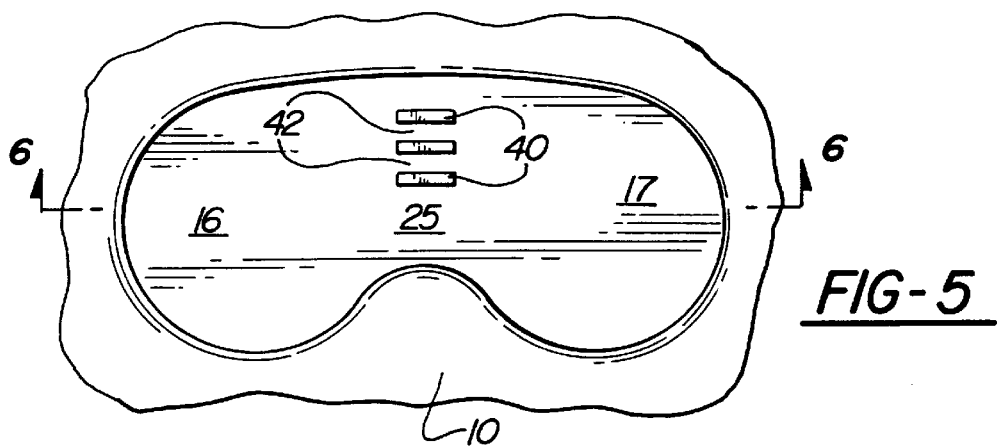
FIG. 5 is a top view of a second alternative embodiment of an apparatus for holding articles.
Figure 6:
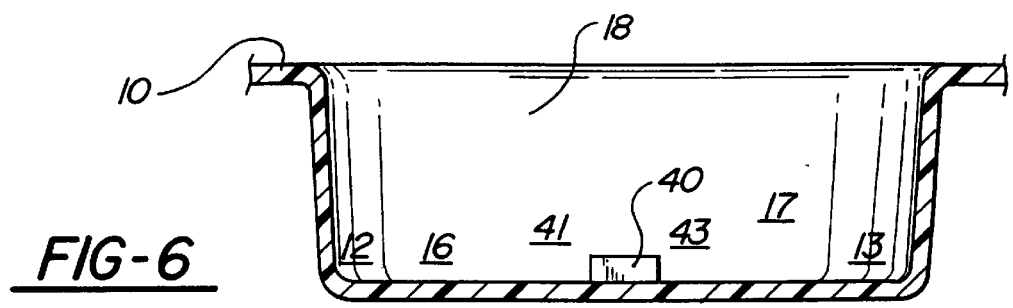
FIG. 6 is a cross sectional view of the second alternative embodiment along the line 6—6 of FIG. 5.

Turning to FIG. 5, a second alternative embodiment is illustrated in a top view. The channel 25 includes a plurality of ridges 40 projecting from floor 28 and extending laterally within channel 25. The plurality of ridges 40 do not extend into receptacles 17 and 18 and, therefore, do not effectively compromise apparatus' 14 ability to hold beverage containers. Letters and other elongated objects can be securely held within the spaces 42 between ridges 40. FIG. 6 illustrates a cross sectional view of FIG. 5.

While the above description constitutes the preferred embodiment of the invention, it will be appreciated that the invention is susceptible to modification, variation, and change without departing from the proper scope or fair meaning of the accompanying claims.

What is claimed is:

1. A cupholder in a motor vehicle for limiting movement of beverage containers disposed therein, said cupholder comprising:

a center console of said motor vehicle having a recess formed therein, said recess having a floor and disposed to receive beverage containers therein;

a first arcuate side wall extending upward from said floor and defining a substantial portion of a first cylindrical receptacle, said cylindrical receptacle having a diameter and a radius, said first arcuate side wall having a height, wherein said height is substantially greater than said radius;

a second arcuate side wall extending upward from said floor and defining a substantial portion of a second cylindrical receptacle;

a wall substantially tangent to said first and second cylindrical receptacle;

a channel formed between said first and second cylindrical receptacles that is offset from a lateral centerline of the cupholder, wherein said wall interconnects said first and second arcuate side walls; and a second wall cooperative with said wall to define said channel that extends between said first and second cylindrical receptacles.

2. The apparatus as set forth in claim 1, further comprising a first stationary ridge projecting from said floor between said first receptacle and said channel.

3. The apparatus as set forth in claim 2, further comprising a second stationary ridge projecting from said floor between said second receptacle and said channel, said second stationary ridge cooperates with said first stationary ridge, said wall, and said second wall to create a storage area.

4. The apparatus as set forth in claim 1, further comprising a laterally extending ridge projecting from said floor in said channel, said ridge extending laterally in a direction substantially parallel to said wall.

5. A cupholder for use in a motor vehicle for limiting movement of beverage containers disposed therein, said cupholder comprising:

a main structure having a recess formed therein, said recess having a floor and disposed to receive beverage containers therein;

a first arcuate side wall extending upward from said floor and defining a substantial portion of a first cylindrical receptacle, said cylindrical receptacle having a diameter and a radius, said first arcuate side wall having a height, wherein said height is substantially greater than said radius;

a second arcuate side wall extending upward from said floor and defining a substantial portion of a second cylindrical receptacle;

a wall substantially tangent to said first and second cylindrical receptacle;

a channel formed between said first and second cylindrical receptacles that is offset from a lateral centerline of the cupholder, wherein said wall interconnects said first and second arcuate side walls; and a second wall cooperative with said wall to define said channel that extends between said first and second cylindrical receptacles.

* * * * *